Dec. 22, 1970  W. B. STEIN  3,548,473
POCKET-TYPE CUTTING INSERT
Filed March 27, 1968  2 Sheets-Sheet 1

INVENTOR.
WILLIAM B. STEIN
BY Freeman & Taylor
ATTORNEYS

Dec. 22, 1970   W. B. STEIN   3,548,473
POCKET-TYPE CUTTING INSERT
Filed March 27, 1968   2 Sheets-Sheet 2

INVENTOR.
WILLIAM B. STEIN
BY
ATTORNEYS

United States Patent Office 3,548,473
Patented Dec. 22, 1970

3,548,473
POCKET-TYPE CUTTING INSERT
William B. Stein, Barberton, Ohio, assignor to The Warner & Swasey Company, Cleveland, Ohio
Filed Mar. 27, 1968, Ser. No. 716,389
Int. Cl. B23p *15/28;* B26d *1/00*
U.S. Cl. 29—95                                               5 Claims

ABSTRACT OF THE DISCLOSURE

An improved cutting insert for metal cut-off tools that is characterized by an elongate pencil-like shank portion of steel having a V-shaped bottom edge and further having a pocket provided at the juncture of its front and top surfaces, with the pocket being formed by walls disposed at an angle with respect to each other and receiving a complementally shaped cutting tip that preferably has precast front, side, and rear clearance angles provided thereon. The cutting bit, preferably of a diamond shaped configuration in elevation is wedged into the pocket so as to increase the rigidity of the cutting tool during use.

RELATED APPLICATIONS

Except for concurrently filed applications entitled "Improved Cut-Off Tool and Holder Therefor" and entitled "Improved Insert Bit for Cut-Off Tools Having Aligning Means Between Tip and Shank" and the insert shown and claimed in Novkov U.S. Pat. 2,964,833, there are no related applications.

BACKGROUND OF THE INVENTION

In Novkov U.S. Pat. 2,964,833, there was disclosed an insert bit for cut-off tools that approximates the overall configuration of the insert of the instant invention. However, in the aforesaid patent, the cutting tip per se was formed of carbide or other similar material and constituted a co-extensive projection of the shank member to which it was brazed. Also, the cross sectional profile of tip and shank in the aforesaid patent was substantially identical with the top surfaces and bottom surfaces being co-planar and with the usual clearance angles being ground on the tool following assembly of the same.

DESCRIPTION OF THE PRIOR ART

Except for the aforementioned related applications, no pertinent art is known to applicant.

SUMMARY OF THE INVENTION

While the aforementioned insert has proved to be a definite advance in the art of cut-off tooling, as evidenced by the commercial success thereof, it has nonetheless been found that the cutting characteristics of the same can be enhanced if certain improvements are made concerning the inter-relationship between the shank and tip portion.

Specifically, it has been found that if the shank portion of the tool is provided with a pocket that opens into the front and top surfaces of the shank with the walls of the pocket being disposed at an angle with respect to each other, that such a pocket will be able to receive a complementally, diamond shaped parallelogram type tip that will complementally engage the walls of the pocket.

By this arrangement, the walls of the pocket form the equivalent of a V-block so that the forces of cut-off which are principally downward and rearward with respect to the tip, will have their main resultant force directed towards the V-portion of the pocket.

By this arrangement, increased rigidity is obtained, not only due to the unique manner in which the force is absorbed by the V of the pocket, but also due to the fact that added brazing surfaces are provided by the inclined pocket wall and additional surface is presented beneath the tip. It has also been found that by precasting the tip to form into the same the requisite back, side, and front clearance angles that the width of the shank stock required can be reduced without affecting the operation of the tool during cut-off. This is true because the precasting of these angles eliminates the necessity for post-assembly grinding with the result that the insert and shank can be made narrower without reducing the cut-off strength.

Since the operation of cut-off creates waste material, it is axiomatic that, the narrower the groove made during cut-off, the less waste material will be created with the result that not only are savings in the cost of manufacturing the insert achieved by this construction, but further savings are also effectuated during use.

As a still further advantage, employment of a cutting tip having a substantial height permits the tool to have the substantial characteristics of a full carbide tip insert while yet retaining the advantages of a so-called wafer type construction.

Production of an improved insert bit for cut-off tools having the above advantages accordingly becomes the principal object of this invention, with these and other objects of the invention becoming more apparent upon a reading of the following brief specification, considered and interpreted in view of the accompanying drawings.

Figure 3:
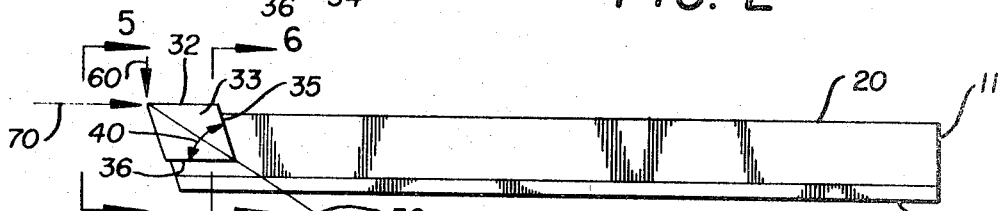
FIG. 3 is a side elevational view of the improved insert bit.
Figure 4:
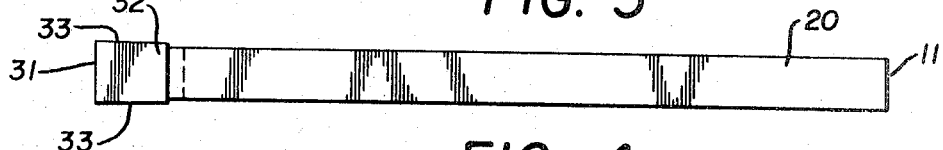
FIG. 4 is a top plan view of the improved insert bit.
Figure 5:
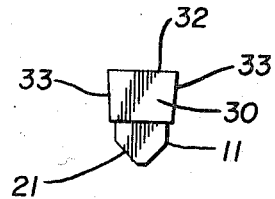
Figure 6:
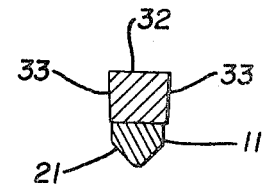

FIGS. 5 and 6 are sectional views taken on the lines 5—5 and 6—6 of FIG. 3.

Figure 7:
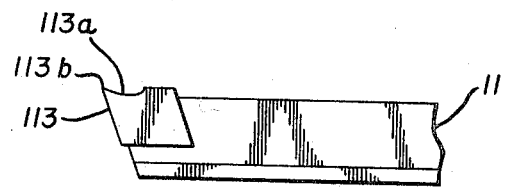
Figure 8:
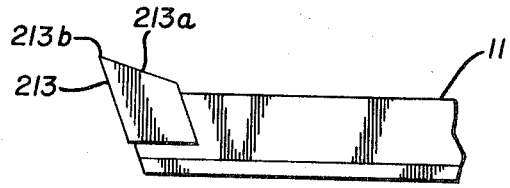
Figure 9:
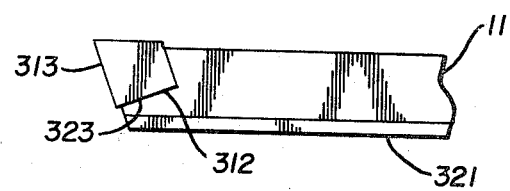

FIGS. 7, 8 and 9 are partial side elevational views of the improved insert showing modifications thereof.

DESCRIPTION OF THE PREFERRED EMBODIMENT

Figure 1:
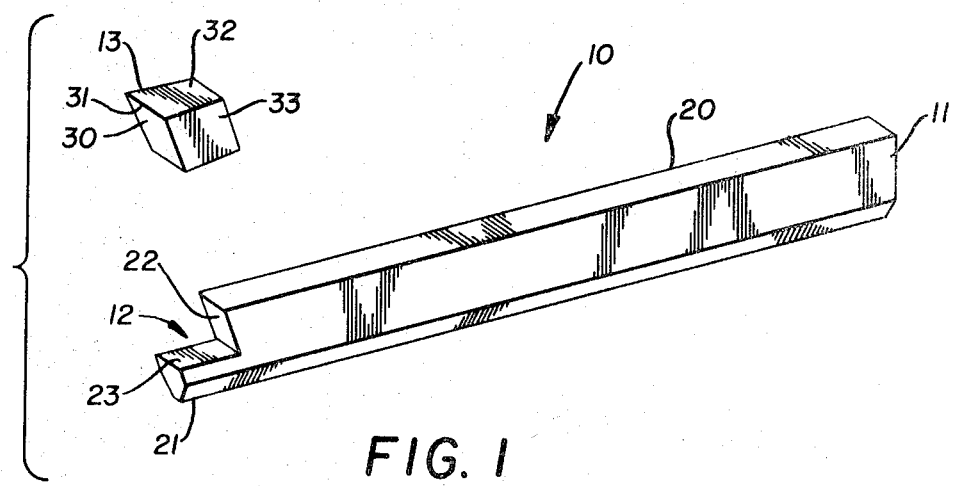
FIG. 1 is an exploded view of the improved insert bit.
Figure 2:
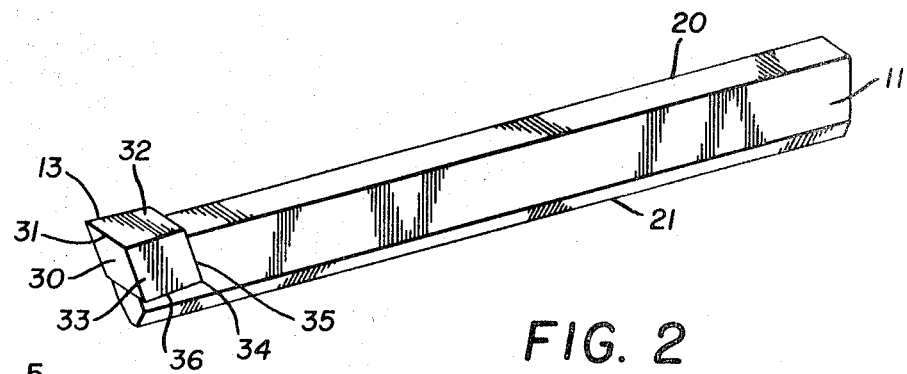
FIG. 2 is a similar perspective view showing the tip and shank in assembled condition.

Referring now the drawings and in particular to FIGS. 1 and 2 thereof, the improved insert bit, generally designated by the numeral 10, includes an elongate shank portion 11 having a forward pocket 12 within which a cutting tip 13 may be received and secured in place in properly aligned relationship by brazing or similar means.

The shank 11 is elongated so that the length dimension thereof is a substantial multiple of the height dimension with the shank further including a top planar surface 20 and a V-shaped bottom surface 21 with the arrangement being such that the top surface 20 is preferably perpendicular to a plane passing midway between the inclined faces of the V-shaped bottom 21.

The pocket 12 includes a downwardly and rearwardly extending face 22 that intersects a surface 23 with the surface 23 being preferably parallel to the top surface 20 and being disposed at less than 90° with respect to the surface 22 as clearly shown in FIGS. 1 through 3 of the drawings. From a material standpoint, the shank portion 11 is preferably made of tool steel or the like so as to minimize the cost thereof, especially when compared with carbide.

Turning next then to the cutting tip 13 and viewing the same first with respect to FIG. 3 of the drawings, it will be noted that the same is generally a parallelogram having a diamond contour in elevation to thus permit the same to be received within the pocket 12 as clearly shown in FIGS. 1, 2, and 3.

The forward face 30 of the tip 13 slopes downwardly and rearwardly from cutting edge 31 to provide front clearance while sides 33, 33 narrow from top to bottom to provide clearance and from front to rear to provide back clearance.

The opposed side faces 33, 33 are the product of compound angles created by the grinding, molding or precasting of front, back, and side clearances into the faces 30 and 32 with it being preferred that the width of the bit at the point 34, which is the point of juncture between rear face 35 and bottom face 36, be approximately equal to the width of the shank member 11 with this condition being illustrated by the sectional views of FIGS. 5 and 6.

From a material standpoint, the insert 13 is preferably of carbide or similar hard cutting material that lends itself to an effective cut-off operation as well as to being readily attached to the shank by brazing the same within the pocket 12 as has been described.

It will further be noted that the height of the tip 13 as defined by the distance between the preferably parallel top and bottom surfaces 32 and 36 is substantially greater than half of the overall height of the insert 10 per se. Thus the tip 13 projects above the plane at the top surface 20 of shank 11. Such a geometric construction permits the insert 10 to have the characteristics of a full carbide tipped insert while yet avoiding certain disadvantages that occur with respect to the same.

With reference to the pocket angle 40 formed by the wall surfaces 22 and 23, the same is shown in FIGS. 1, 2 and 3 approximating an angle of 75° although it is to be understood that certain latitude is permitted in this regard with suitable test results having been obtained with angle ranges between 60 and 85°.

It will also be noted that this angle 40, is adapted to have the apex portion thereof in line with the resultant combined downward and readward cut-off forces received during use with this resultant being indicated by the arrow 50 in FIG. 3 of the drawings and being caused by tangential, chip separation forces (arrow 60) and radial feed forces (arrow 70). It is to be understood in this regard, however, that the direction of this resultant of cut-off force, indicated by the arrow 50, can vary depending on circumstances such as rate of speed, toughness of material, width of cut-off groove, sharpness of the tool and the like.

The modification shown in FIG. 7 shows the conventional shank 11 with a modified tip 113. This tip is similar to the tip 13 but has a groove 113a immediately behind the cutting edge 113b in order to facilitate chip removal.

In the form of the invention shown in FIG. 8 the shank 11 receives a cutting tip 213 which has its top surface 213a tapering rearwardly from cutting edge 213b to provide a positive rake angle.

In FIG. 9 the shank 11 has the pocket 312 cut therein with its bottom surface 323 being disposed out of parallel relationship with the bottom surface 321 of the shank. The insert 313 is seated in the pocket in the same manner as previously described with regard to FIGS. 1 through 6.

It should be noted also that, while the preferred form of the invention as shown that the angle at the bottom and back walls of the pocket is generally an acute angle, it is possible to utilize either a 90 degree angle or an obtuse angle if desired.

It should also be noted that while the tip 13 of FIG. 1 has been shown with continuous top, bottom and side walls that this is not absolutely necessary and the clearance angles required can be obtained if desired by merely tapering the side walls for example throughout part of their length, the remaining portions of the walls being parallel to each other.

While a full and complete description has been set forth in accordance with the dictates of the patent statutes, it is to be understood that the invention is not intended to be the specific form herein shown. Accordingly, modifications of the invention may be resorted to without departing from the spirit hereof or the scope of the appended claims.

What is claimed is:

1. A cutting insert of the character described, comprising;
   (A) an elongate, pencil-like shank
      (1) with top, bottom and opposed side surfaces
      (2) front and rear ends
      (3) with a pocket formed in said front end;
   (B) said pocket having
      (1) a rear wall extending downwardly from said top surface
      (2) and a bottom wall extending rearwardly from said front end to a point of juncture with said rear wall;
   (C) a cutting member
      (1) having a substantially diamond shaped profile and adapted to be seated in said pocket
      (2) and having a cutting edge adapted to be positioned in substantially opposed relationship to the point of juncture of said rear and bottom walls of said pocket when said cutting member is seated therein;
   (D) means for securing said cutting member in said pocket;
   (E) the length of said bottom wall being at least approximately equal to the length of said rear wall, with the lengths of the corresponding surfaces of said seated cutting member being coplanar with said bottom and rear walls and being approximately equal in length thereto, whereby said seated cutting member will be adapted to absorb the chip separation and radial feed forces that occur during cut-off and
   (F) the depth of said cutting member as defined by the length of said bottom wall being at least equal to the depth of said shank portion beneath said cutting member.

2. The device of claim 1 further characterized by the fact that said bottom wall of said pocket lies in a plane that is inclined with respect to the planes of said top and bottom surfaces of said shank.

3. The device of claim 1 further characterized by the fact that said rear and bottom walls of said pocket form an acute angle.

4. The device of claim 1 further characterized by the fact that said cutting member has a chip removing arcuate area disposed in its top surface behind said cutting edge.

5. The device of claim 1 further characterized by the fact that said cutting member has a top surface that tapers rearwardly and downwardly from said cutting edge.

References Cited

UNITED STATES PATENTS

| 1,629,667 | 5/1927 | Knipple | 29—96 |
| 2,674,028 | 4/1954 | Kontra | 29—95 |
| 3,254,392 | 6/1966 | Novkov | 29—95 |

FOREIGN PATENTS

| 507,540 | 6/1939 | Great Britain | 29—96 |
| 552,382 | 4/1943 | Great Britain | 29—96 |
| 1,360,269 | 3/1964 | France | 29—96 |
| 60,147 | 11/1947 | Netherlands | 29—96 |
| 6,608,989 | 1/1967 | Netherlands | 29—95 |

HARRISON L. HINSON, Primary Examiner